Figure 1:
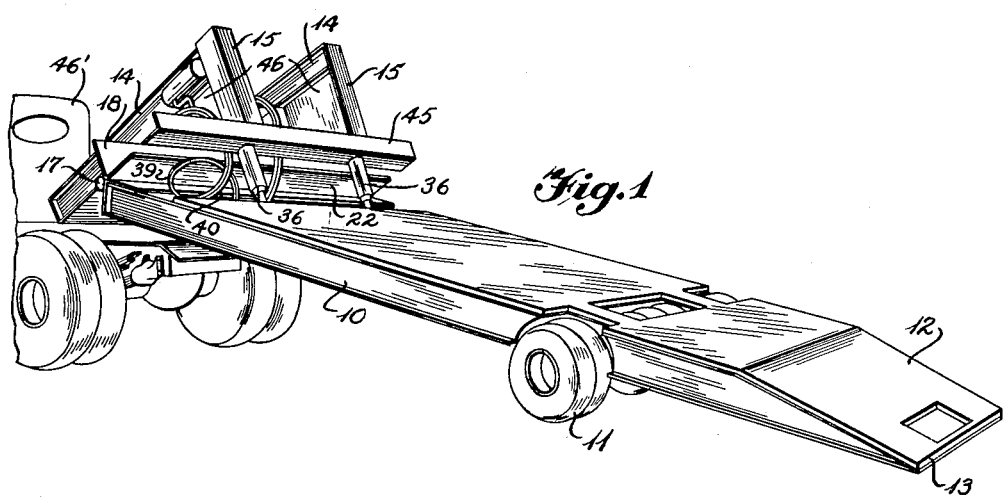

July 17, 1956  R. J. KERN  2,754,987
HINGED GOOSENECK FOR TRAILER
Filed Aug. 21, 1953  2 Sheets-Sheet 1

INVENTOR
ROY J. KERN
BY
A. Yates Dowell
ATTORNEY

July 17, 1956  R. J. KERN  2,754,987
HINGED GOOSENECK FOR TRAILER
Filed Aug. 21, 1953  2 Sheets-Sheet 2

INVENTOR
ROY J. KERN

BY
*A. Yates Dowell*
ATTORNEY

United States Patent Office 2,754,987
Patented July 17, 1956

2,754,987

HINGED GOOSENECK FOR TRAILER

Roy J. Kern, Schnecksville, Pa.

Application August 21, 1953, Serial No. 375,602

5 Claims. (Cl. 214—505)

This invention relates to the transportation of materials of various kinds particularly those which are relatively large, heavy and difficult to load and unload. The invention is particularly concerned with a hinged gooseneck for a trailer, by means of which the rear portion thereof can be lowered to the ground to form an inclined plane for loading, and raised thereafter for supporting the load in a horizontal position in transit, such construction making loading and unloading relatively simple.

In the transportation of heavy articles or equipment, such as road and other machinery, including that having traction belts around what normally would be the ground-engaging wheels, it is desirable to move the load bodily onto the vehicle so that it may be possible readily to transport and unload the same. A problem is thus presented on account of size and weight, and the present invention is concerned with the solution of this problem.

It is an object of the invention to provide a trailer or other vehicle having means for lowering its rear end into contact with the ground to provide what is in effect a ramp, up which a heavy vehicle or other object may be moved for loading, and down which such object may be moved for unloading, as well as a vehicle having means for raising such rear end after the loading or unloading is completed.

Another object of the invention is to provide a mounting for the front end of the trailer or other vehicle so that it may be raised and lowered as desired to move the body of the vehicle from a horizontal load supporting position to an inclined position so that its rear end portion will be in contact with the ground and its forward end elevated, and with means for returning the body of the vehicle to a substantially horizontal load supporting position.

A further object of the invention is to provide a vehicle having a bed supported by axle and wheel construction located transversely near the center of the bed, and a tractor or motivating vehicle with means for attachment of the front end of the bed thereto so that such bed may be rocked or oscillated on its axle to swing its rear end portion into contact with the ground so that a heavy structure such as a tractor may be moved up the ramp-like incline thus provided and the bed oscillated reversely to return it to its initial horizontal load carrying position, whereupon the tractor or motivating vehicle can draw the other vehicle after it in the transportation of its load.

A further object of the invention is to provide relatively simple effective means for connecting a vehicle to a truck propelling vehicle in a manner to facilitate the loading of cargo.

A still further object of the invention is to provide a controlled hinge or joint between a leading and a trailing vehicle to make it possible to change the position of the latter in the normal use of the same.

Figure 2:
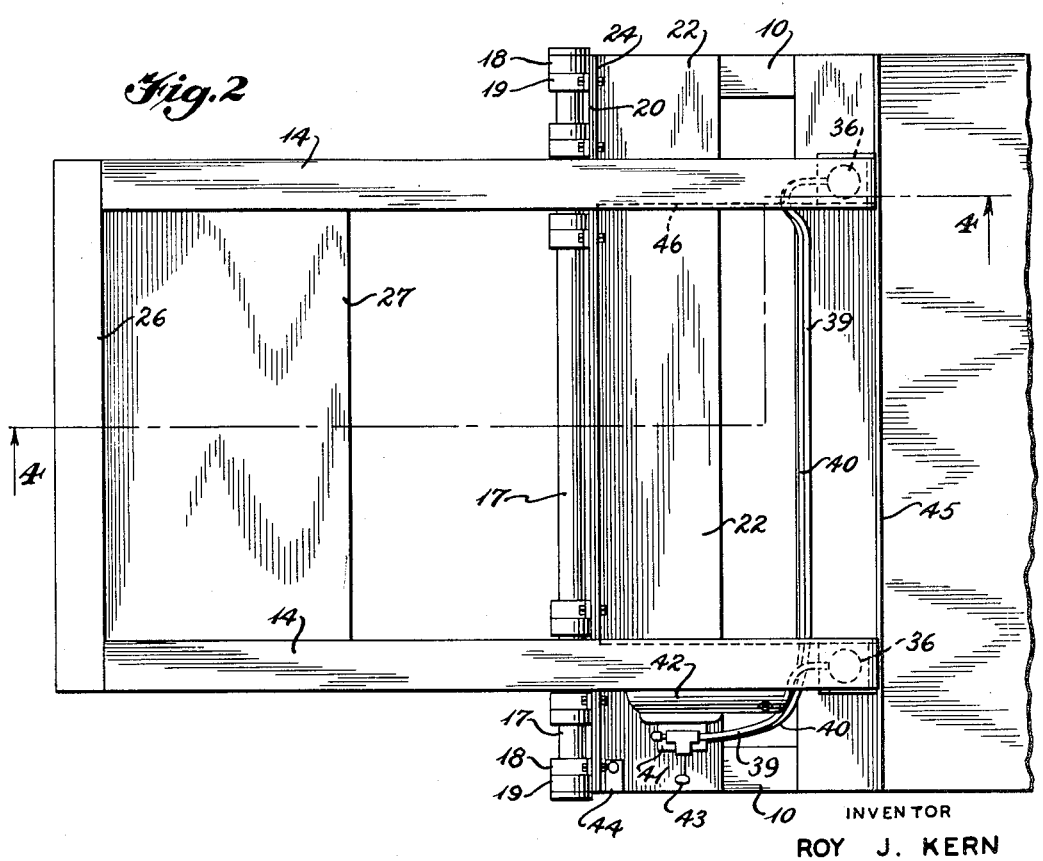
Figure 3:
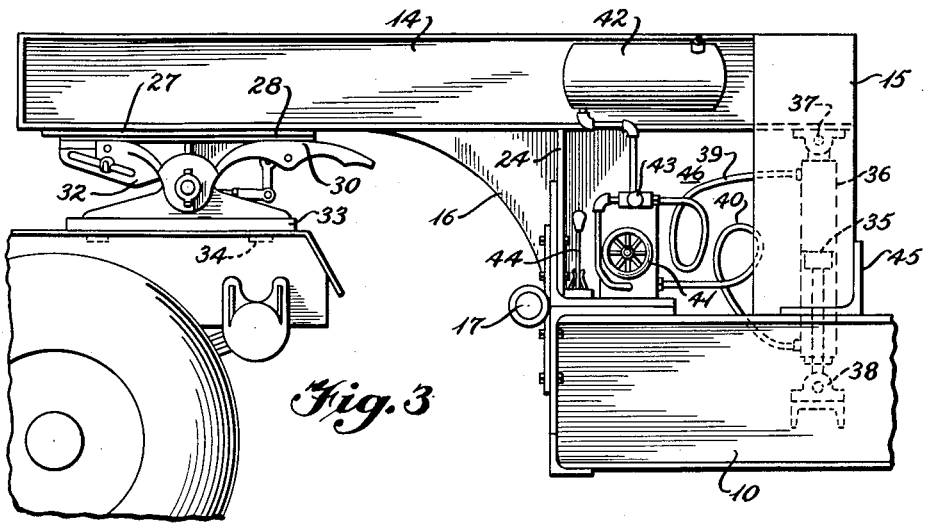
Figure 4:
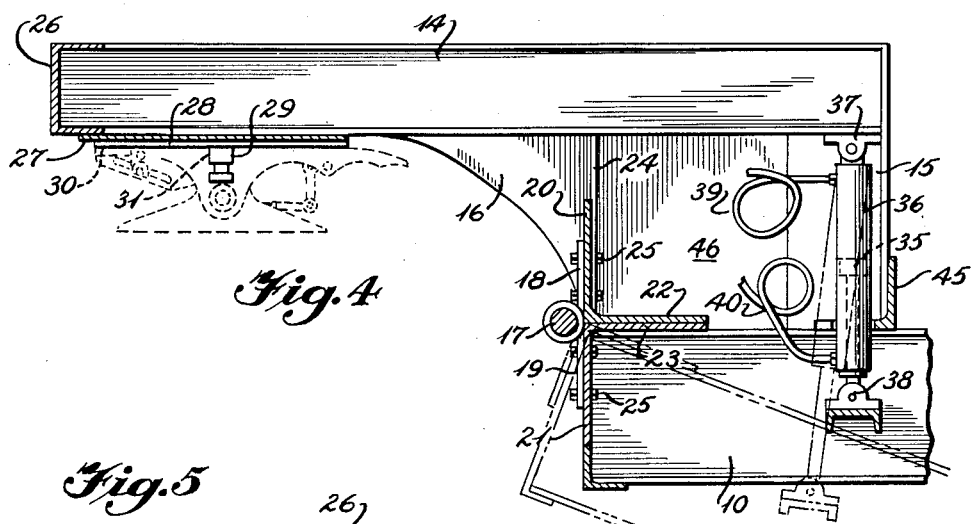
Figure 5:
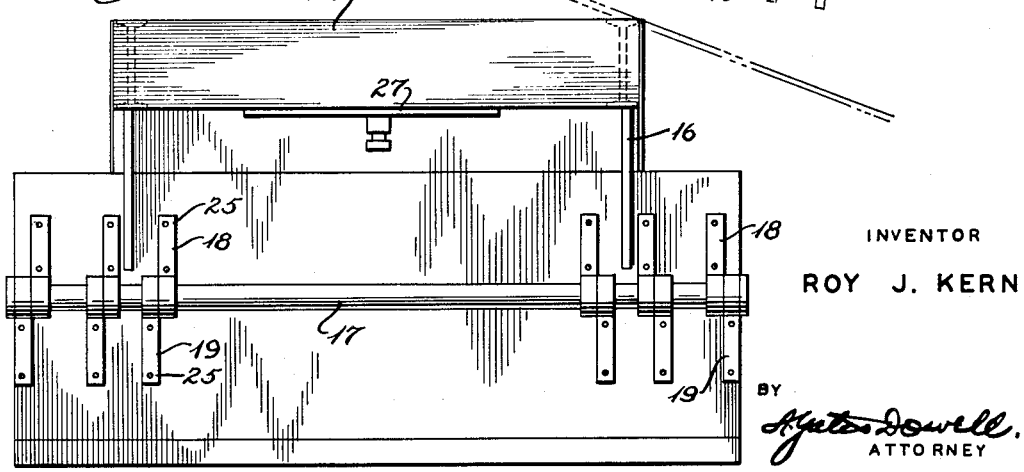

Further objects and advantages of the invention will be apparent from the following description taken in conjunction wtih the accompanying drawings, wherein:

Fig. 1 is a perspective illustrating one application of the invention;

Fig. 2, a top plan view of the gooseneck or front end portion of the trailer;

Fig. 3, a fragmentary side elevation of the gooseneck connection between the tractor and the trailer;

Fig. 4, a section taken on line 4—4 of Fig. 2 as shown in full lines with a dotted line showing of the relative positions of the trailer body and hydraulic cylinder and piston corresponding to the loading or unloading position of Fig. 1; and Fig. 5, a front elevation of the gooseneck.

Briefly stated, the invention comprises a trailer having a body or bed supported intermediate its ends by transversely disposed axle and wheel structure so that such body or bed can rock or oscillate.

Thus, when the rear end of the body or bed is in contact with the ground, an inclined plane or ramp-like surface is provided to facilitate movement of heavy objects up the same and onto the trailer. If desired, the rear end portion of the body may be tapered to avoid an abrupt joint or step at the lower end of the ramp.

The front end of the trailer body or bed is provided with an L-shaped gooseneck frame hinged transversely to such body or bed so that pivoting of the hinge will produce rocking of the body or bed.

The present invention further is concerned with the control of the operation of such hinge and the rocking or tilting of the trailer body to produce the inclined plane or ramp along which heavy structures may be moved onto and from the trailer.

The front end of the gooseneck is provided with the conventional type of fifth wheel construction including a pair of horizontally disposed pivot plates connected by a central pivot so that relative rotation between them may be had. The lower pivot plate is fastened at each side to the tractor or truck 46' and is provided with a central opening or socket for the reception of a vertically disposed cooperating pin mounted centrally with an upper pivot plate attached to a transverse member attached to the gooseneck. By means of this connection the truck may move to the right or to the left with the trailer following due to relative movement allowed by the fifth wheel which constitutes in effect a universal joint between the structures.

With continued reference to the drawings, the present invention comprises a pulled or drawn vehicle known as a trailer having a bed 10 supported by a transversely disposed axle and dual-wheels 11 intermediate its end so that such bed or body can rock or oscillate to provide an incline plane or surface to facilitate loading and unloading of bulky and heavy objects.

The rear end of the body is provided with an inclined surface 12 which tapers to a relatively thin rear end 13. When the end 13 is in contact with the ground, an inclined plane or ramp-like surface is provided to facilitate loading of heavy objects onto the body of the trailer as stated and as shown in Fig. 1 of the drawings.

Means is provided for supporting the front end of the bed or body, so that it may be raised and lowered to bring the rear end of the body into contact with the ground and to restore it to horizontal position, such means comprises an L-shaped gooseneck frame composed of horizontally and vertically disposed beams 14 and 15 and web members 16 forming a pair of L-shaped frame members which are connected together in parallel relation to form the L-shaped gooseneck frame, such gooseneck being connected by a pivot pin or shaft 17 to pivot arms 18 and 19 attached to oppositely disposed vertical flanges 20 and 21 of angle bars having horizontal flanges 22 and 23.

The angle bar having the vertical flange 20 and the horizontal flange 22 is attached to the vertical flange 24 of web member 16, in order to have a rigid connection with the angle members 14 and 15. Likewise, the angle member having the depending flange 21 and the horizontal flange 23 is connected to the bed or body members 10 across the front end and the upper surface of the same. The flanges 18, 19, 20, and 21 may be secured by bolts 25 as shown or may be attached in any other desired manner.

Thus the flanges 22 and 23 are disposed one above the other in contacting relation when the bars are in horizontal position, but are spaced apart when the gooseneck is moved relative to the body of trailer.

At its other end, the gooseneck is provided with a transverse member 26, and a second or bottom transverse member or plate 27. Beneath the transverse member 27 is provided a conventional fifth wheel including a top plate 28, a depending pin 29, a bottom plate 30, provided with a receiving opening 31 for the pin 29. The bottom plate 30 is mounted on a transverse frame 32 pivoted at each end in supporting brackets 33, attached to the transverse portion of the frame 45 of a tractor or truck 46 by means of fastening elements 34.

By means of this fifth wheel connection, the motivating vehicle, such as a tractor or truck, may move to the right or the left, due to the universal joint provided, over hills and valleys in the road and variations in grading.

In order to cause operation of the hinge between the bed and the gooseneck, any desired power means may be employed, hydraulic power means having been found satisfactory and is used by way of example and not by way of limitation. The hydraulic means includes a pair of spaced pistons 35, located in cylinders 36. Each cylinder is connected by a pivot 37 to the gooseneck, and the piston 35 is connected by a similar pivotal joint 38 with the frame 10 of the trailer.

Hydraulic lines 39 and 40 supply hydraulic fluid for producing relative movement between the pistons and the cylinders. For purposes of illustration, one piston is disposed adjacent each side of the body.

It will be understood that when fluid is introduced through the line 39 into the cylinder above the piston, relative movement between the piston and cylinder will occur to produce operation of the hinge and swinging of the gooseneck relative to the trailer and consequently, elevation of the front of the bed of the trailer and lowering of the rear of such bed to provide an inclined surface or ramp for use in loading and unloading.

A pump or compressor 41 is provided for supplying hydraulic fluid from a reservoir 42 through lines 39 and 40 and a control valve 43 may be employed for directing the fluid into these lines. The pump may be driven in any desired manner as, for example, from the hydraulic system of a tractor under the control of a switch 44.

Desirably, and for purposes of greater strength, the lower extremities of the vertically disposed beams 15 may be secured by welding, or the like, to a transverse beam or angle member 45 of a length approximating the width of the body or bed 10 of the trailer. It will be understood that when the combined unit of tractor and trailer is in position for movement upon the highway, the lower face of the beam 45 rests upon the bed of the trailer and thus the weight of the gooseneck per se and its related structural elements are adequately supported so that no undue stresses are imposed upon the fifth wheel structure.

Each L-shaped gooseneck frame member includes a horizontal beam 14 and vertically disposed beam 15, which are braced by means of web member 16 and plate 46, which plates form part of the leg of the L-shaped frame member. The forwardmost portion of the free end of such leg is pivotally connected by shaft 17 to the body 10 as clearly shown in Fig. 4, while the angle member 45 provides a bearing surface to take the reaction of the rear end of the L-shaped gooseneck frame member against the body in load-carrying condition, a portion of such angle member 45 being cut away to permit the cylinder 36 to move in the angular position as shown in dotted lines in Fig. 4, for obtaining the loading and unloading relation of the trailer with respect to the ground.

It will be obvious to those skilled in the art that various changes may be made in the invention without departing from the spirit and scope thereof and therefore the invention is not limited by that which is shown in the drawings and described in the specification but only as indicated in the appended claims.

What is claimed is:

1. A hinged gooseneck connection for use between a tractor and a trailer, said gooseneck comprising a longitudinal structure having a forward end adapted to be joined to a conventional fifth wheel on a tractor, said longitudinal structure having its rear end connected to a downwardly extending portion adapted to be connected to the forward end of a trailer, said downwardly depending portion being hinged to the trailer and having an abutting surface adjacent said hinge means adapted to contact the top of said trailer, power means extending between the trailer and the under side of said gooseneck adapted to produce hinged movement between said gooseneck and said trailer, to raise the front end of the trailer and simultaneously lower its rear end into contact with the ground, thereby providing an inclined surface to facilitate the loading and unloading of heavy objects onto and from the trailer, said power means being supported substantially below the top surface of and ahead of the rear surface of said gooseneck, thereby being protected from damage by the load on the trailer.

2. A trailer for carrying articles and equipment and designed for easy unloading of such articles or equipment from the rear end of the trailer, said trailer including an elongated body having ground engaging wheels mounted on said body so that the body may pivot about the wheels, a gooseneck frame positioned to overlap the upper surface of the forward end of the trailer body and pivotally mounted by an intermediate portion thereof to the front end of the trailer body and having its rear end adapted to contact the trailer body rearwardly of said pivotal mounting, the forwardly extending portion of the gooseneck frame projecting forwardly of the trailer body and adapted to be mounted on a towing vehicle for universal movement, and power means reacting between said frame and said body for exerting force between the body and said frame whereby the angularity of the trailer with respect to the ground may be varied.

3. A trailer for carrying articles and equipment for easy loading of such articles or equipment from the rear end of the trailer, said trailer including an elongated body having ground engaging wheels mounted on said body intermediate the forward and rear ends thereof so that the body may pivot about the wheels and the rear end of the trailer may contact the ground to permit a vehicle to be driven onto the trailer from the rear, an L-shaped gooseneck frame positioned with the leg extending downwardly and its stem extending forwardly of the trailer, said leg being of substantial width with its end overlapping the trailer body, said L-shaped frame being pivotally mounted by the forwardmost portion of the free end of its leg to the front end of the trailer body and having the rearwardmost portion of the free end of its leg adapted to contact the trailer body rearwardly of said pivot, the stem of said L-shaped gooseneck frame being adapted to be mounted on a towing vehicle for universal movement, and power means adjacent the leg of the frame for exerting a pushing force between the body and said frame rearwardly of said pivot whereby the angularity of the trailer with respect to the ground may be varied so that the rear end of the trailer may be lowered to contact the ground for loading or be raised from the ground.

4. The invention according to claim 3 in which the power means include at least one hydraulic cylinder and piston unit with one end of said unit pivotally connected to the frame and the other end of said unit pivotally connected to the body.

5. The invention according to claim 3 in which the frame is formed of a pair of L-shaped members arranged in generally parallel relation and the power means includes two hydraulic cylinder and piston units, each hydraulic cylinder and piston unit connected between one L-shaped frame member and said body, one end of each hydraulic cylinder and piston unit being connected to its associated L-shaped member adjacent the vertex and the other end of said hydraulic cylinder and piston unit being pivotally connected to the body, and means being provided for causing simultaneous reciprocation of said hydraulic cylinder and piston units.

References Cited in the file of this patent

UNITED STATES PATENTS

| | | |
|---|---|---|
| 2,351,829 | Milner | June 20, 1944 |
| 2,408,862 | Lisota | Oct. 8, 1946 |
| 2,545,584 | Meadows | Mar. 20, 1951 |
| 2,590,181 | Keesler | Mar. 25, 1952 |
| 2,628,126 | Black | Feb. 10, 1953 |
| 2,653,827 | Manning | Sept. 29, 1953 |
| 2,717,707 | Martin | Sept. 13, 1955 |

FOREIGN PATENTS

| | | |
|---|---|---|
| 760,730 | France | Dec. 27, 1933 |
| 818,853 | France | June 28, 1937 |